United States Patent [19]

Gerling

[11] 4,337,985
[45] Jul. 6, 1982

[54] PIVOTED SHOE BEARING

[75] Inventor: Paul Gerling, Oberhausen, Fed. Rep. of Germany

[73] Assignee: Glyco-Maschinenbau GmbH, Essen, Fed. Rep. of Germany

[21] Appl. No.: 120,110

[22] Filed: Feb. 8, 1980

[30] Foreign Application Priority Data

May 19, 1979 [DE] Fed. Rep. of Germany ....... 2920344

[51] Int. Cl.³ ...................... F16C 17/03; F16C 23/04; F16C 33/74
[52] U.S. Cl. ...................................... 308/36.1; 308/73
[58] Field of Search ........................ 308/36.1, 36.2, 73

[56] References Cited

U.S. PATENT DOCUMENTS

| 3,297,371 | 1/1967 | Salzman | 308/73 |
| 3,370,334 | 2/1968 | Pilarczyk et al. | 308/73 |
| 3,708,216 | 1/1973 | Gerling | 308/73 |
| 3,711,169 | 1/1973 | Gardner | 308/73 |
| 3,807,814 | 4/1974 | Stopp | 308/73 |
| 3,823,991 | 7/1974 | Lamperski | 308/73 |
| 4,039,228 | 8/1977 | Repose et al. | 308/73 |

FOREIGN PATENT DOCUMENTS 2149207  2/1973  Fed. Rep. of Germany .

Primary Examiner—Richard R. Stearns
Attorney, Agent, or Firm—Karl F. Ross

[57] ABSTRACT

A journal bearing with pivoted shoes for supporting a shaft for rotation about a limitedly tiltable axis includes a frame with annular recesses for receiving guide pins extending from the shoes substantially parallel to the rotation axis. Inwardly projecting crossbars of the frame are disposed between respective pairs of shoes for spacing the same, while a pair of split sealing rings floatingly mounted in the recesses are clamped by springs to the shoes for limiting the lateral displacement thereof and to the shaft for forming a lubricant-tight fit even upon radial motion of the shaft at the bearing.

4 Claims, 3 Drawing Figures

PIVOTED SHOE BEARING

FIELD OF THE INVENTION

My present invention relates to a journal bearing and, more particularly, to a pivoted shoe bearing.

BACKGROUND OF THE INVENTION

As indicated in German Pat. Ser. No. 2,149,207, a pivoted shoe journal bearing generally includes a multiplicity of shoe segments pivotally mounted in a circular configuration in a cage for engaging a shaft with an axis of rotation extending generally perpendicularly to a plane defined by the shoe segments. Because the segments are pivotable, they are able to accommodate limited radial motion of the shaft due to a tilting thereof. It is necessary for the cage to be provided with means for limiting the angular or circumferential movement of the bearing segments, i.e. to ensure a minimal spacing between adjacent segments, and with seals for holding a lubricant in the intersegmental spaces.

Conventional shoe bearings of the above-described type have split-ring seals fixed to inside faces of the cage, which mounting prevents the rings from following the radial motion of the shaft and, consequently, damages the tightness of the seal. Furthermore, a ring or band fixed to the cage engages grooves in outer surfaces of the bearing segments for limiting the lateral or axial motion thereof; this device proves to be cumbersome, particularly during assembly.

OBJECTS OF THE INVENTION

An object of my present invention is to provide a bearing of the above-described type with a more effective seal.

Another object of my present invention is to provide such a bearing with simplified means for limiting the motion of the shoes.

SUMMARY OF THE INVENTION

A pivoted shoe bearing fixable in a housing for supporting a shaft for rotation about a limitedly tiltable axis comprises, according to my present invention, a frame or cage securable to the housing and a plurality of bearing segments having concave cylindrical surfaces with radii of curvature equal to the radius of the shaft. The segments are pivotally mounted in the frame in a substantially circular configuration for engaging at the concave surfaces of the shaft to enable rotation and slight radial motion thereof. The bearing further comprises a pair of sealing rings floatingly mounted on axially opposite sides of the segments, i.e. substantially perpendicularly to the shaft's rotation axis, for limiting axis or lateral motion of the segments and for forming a lubricant-tight fit with the shaft to ensure retention of adequate lubricant by the bearing, especially upon insertion of the same into the housing.

According to another feature of my present invention, the bearing is provided with two inwardly facing annular recesses disposed generally perpendicularly with respect to the rotation axis. The bearing segments have guide pins extending substantially parallel to the rotation axis for engaging the recesses to limit radial motion of the segments. The sealing rings are also mounted in the annular frame recesses at least in part for sealing same.

According to further, more particular features of our present invention, the rings are split and are forcibly engagable with the shaft by means of springs between the ring halves and the frame, while the latter includes a plurality of radial projections equal in number to the bearing segments and extending inwardly between respective pairs of segments for limiting motion thereof tangentially with respect to the shaft.

It is to be noted that in a bearing according to my present invention, the lubricant seal is improved owing to the floating rings, which simultaneously perform the additional function of aligning the bearing segments, i.e. containing their lateral movements. Thus, the means for mounting the segments are simplified without detriment to the seal. The splits in the rings are closeable with the aid of the lubricant.

BRIEF DESCRIPTION OF THE DRAWING

These and other features of my present invention will now be described in detail, reference being made to the accompanying drawing in which.

SPECIFIC DESCRIPTION

Figures 1, 2:
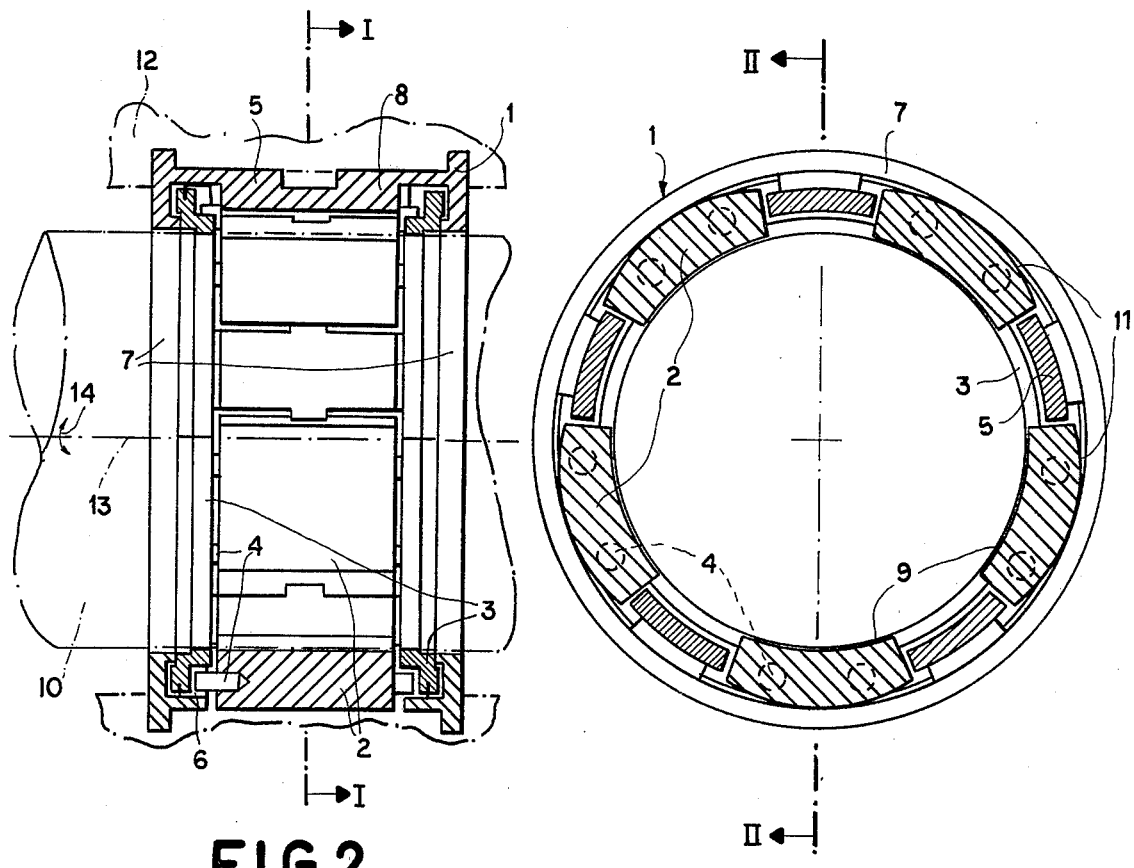
FIG. 1 is a cross-sectional view of a bearing according to my present invention, taken along line I—I in FIG. 2.
FIG. 2 is a cross-sectional view taken along line II—II in FIG. 1.

As shown in FIGS. 1 and 2, a bearing according to my present invention comprises a plurality of curved bearing segments or shoes 2 and a frame or cage 1 which has a pair of parallel rings 7 interconnected by crosspieces 8. The crosspieces includes projections 5 extending inwardly between respective pairs of adjacent shoes 2 for spacing the same in a generally circular configuration. The shoes have concave cylindrical inner surfaces 9 with radii of curvature equal to the radius of a shaft 10 (FIG. 2) for forming a sliding engagement therewith and are provided with convex cylindrical outer surfaces 11 having radii of curvature less than the shaft's radius for forming a rolling or rocking engagement with an inner surface of a housing 12 upon insertion of the bearing assembly thereinto. Inner surfaces 9 may be coated with a self-lubricating layer, for example, of molybdenum disulfide.

Figure 3:
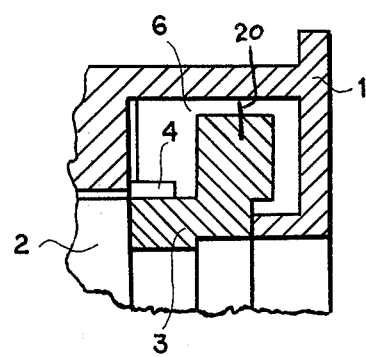
FIG. 3 is a broken cross-sectional view, showing in detail a portion of FIG. 2.

Angular motion or displacement of shoes 2, i.e. motion tangential with respect to shaft 10, is contained by spacer projections 5, while pivoting motion of the shoes and, therefore, radial displacement of shaft 10 are limited by means of guide pins 4 mating with shoes 2 in respective bores thereof and slidingly seated in annular recesses 6 formed in rings 7 of frame 1. A pair of split rings 3 floatingly mounted in recesses 6 as represented by arrows in FIG. 3 serve the dual purpose of limiting the lateral motion of shoes 2, therefore aligning the same in a generally circular arrangement perpendicular with respect to a rotation axis 13 of shaft 10 the split rings 3 being forcibly engageable with the shaft by springs 20 between the ring halves and the frame 1, thereby forming a lubricant-tight fit with shaft 10 for sealing oil inside the bearing assembly. The bearing seal formed by rings 3 remains effective even upon a slight radial motion of shaft 10 at the bearing assembly, due to a shaft tilting indicated by double-headed arrow 14 in FIG. 2.

I claim:

1. A pivoted shoe bearing fixable in a housing for supporting a shaft for rotation about a limitedly tiltable axis, comprising:

a frame securable to said housing;

a plurality of bearing segments having concave cylindrical surfaces with radii of curvature equal to the radius of said shaft, said segments being pivotally mounted in said frame in a substantially circular configuration for engaging at said surfaces said shaft to enable radial motion thereof; and a pair of sealing rings floatingly mounted on said frame at axially opposite sides of said segments for limiting lateral motion thereof and for forming a lubricant-tight fit with said shaft to ensure retention of sufficient lubricant by said bearing.

2. The bearing defined in claim 1 wherein said frame is provided with two inwardly facing annular recesses disposed generally perpendicularly with respect to said axis, said segments being provided with guide pins extending substantially parallel to said axis for engaging said recesses to limit radial motion of said segments, said rings being mounted in said recesses at least in part for sealing same.

3. The bearing defined in claim 2 wherein said rings are split, further comprising spring means disposed between said frame and said rings for closing same.

4. The bearing defined in claim 1, 2 or 3 wherein said frame includes a plurality of radial projections equal in number to said segments, said projections extending inwardly between respective pairs of segments for limiting motion thereof tangential with respect to said shaft.

* * * * *